(12) United States Patent
Choe et al.

(10) Patent No.: US 10,386,840 B2
(45) Date of Patent: Aug. 20, 2019

(54) CRUISE CONTROL SYSTEM AND METHOD

(71) Applicant: HANWHA DEFENSE CO., LTD., Changwon-si, Gyeongsangnam-do (KR)

(72) Inventors: Yun Geun Choe, Changwon-si (KR); Hee Seo Chae, Changwon-si (KR); Jik Han Jung, Changwon-si (KR); Woo Yeol Kim, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 0 days.

(21) Appl. No.: 15/656,748

(22) Filed: Jul. 21, 2017

(65) Prior Publication Data

US 2018/0181127 A1 Jun. 28, 2018

(30) Foreign Application Priority Data

Dec. 28, 2016 (KR) .......... 10-2016-0181447

(51) Int. Cl.

| | |
|---|---|
| *G05D 1/00* | (2006.01) |
| *B60K 31/00* | (2006.01) |
| *G05D 1/02* | (2006.01) |
| *G01S 17/93* | (2006.01) |
| *G01S 17/02* | (2006.01) |
| *G01S 17/08* | (2006.01) |

(52) U.S. Cl.
CPC ....... *G05D 1/0088* (2013.01); *B60K 31/0008* (2013.01); *G01S 17/023* (2013.01); *G01S 17/08* (2013.01); *G01S 17/936* (2013.01); *G05D 1/024* (2013.01); *G05D 1/0231* (2013.01); *B60K 2031/0016* (2013.01); *G05D 2201/0209* (2013.01)

(58) Field of Classification Search
CPC combination set(s) only.
See application file for complete search history.

(56) References Cited

U.S. PATENT DOCUMENTS

| | | |
|---|---|---|
| 9,227,479 B2 | 1/2016 | Clarke et al. |
| 2015/0375753 A1 | 12/2015 | Schrabler et al. |
| 2017/0096144 A1 * | 4/2017 | Elie ........................ B60W 10/18 |

FOREIGN PATENT DOCUMENTS

| | | |
|---|---|---|
| DE | 102009055190 A1 | 6/2011 |
| JP | 5081661 B2 | 11/2012 |
| KR | 10-2015-0119136 A | 10/2015 |

* cited by examiner

*Primary Examiner* — Thomas G Black
*Assistant Examiner* — Ana D Thomas
(74) *Attorney, Agent, or Firm* — Sughrue Mion, PLLC

(57) ABSTRACT

Provided are a cruise control system and method for an autonomous apparatus having a Light Detection and Ranging (LIDAR) device. The cruise control system is implemented by at least one hardware processor and includes an input unit configured to receive scanning information from the LIDAR device, the scanning information related to peripheral environment of the autonomous apparatus; and a main controller configured to determine a scannable region of the peripheral environment and an unscannable region of the peripheral environment based on the scanning information, and to generate obstacle information by detecting a first sunken region in the scannable region and a second sunken region in the unscannable region.

20 Claims, 9 Drawing Sheets

CRUISE CONTROL SYSTEM AND METHOD

CROSS-REFERENCE TO RELATED APPLICATION

This application claims priority from Korean Patent Application No. 10-2016-0181447, filed on Dec. 28, 2016, in the Korean Intellectual Property Office, the disclosure of which is incorporated herein by reference in its entirety.

BACKGROUND

1. Field

Exemplary embodiments relate to a cruise control system and method.

2. Description of the Related Art

Recently, demand for unmanned autonomous cruising of an autonomous apparatus by using an autonomous cruise control system has increased. To that end, a method of generating an autonomous cruising path, for example, using a three-dimensional (3D) laser scanner has been proposed. In the case of using the 3D laser scanner, however, scan data may not be obtained from topography from an area which does not reflect beams, for example, a body of water or cliffs, due to the characteristics of a laser scanner. Therefore, the topography of the region (e.g., the body of water or cliffs) may not be accurately determined with the 3D laser scanner.

SUMMARY

One or more exemplary embodiments include a system and method of planning various cruising paths according to topography of an area without using a plurality of devices.

Additional aspects will be set forth in part in the description which follows and, in part, will be apparent from the description, or may be learned by practice of the exemplary embodiments.

According to an aspect of an exemplary embodiment, there is provided a cruise control system of an autonomous apparatus having a Light Detection and Ranging (LIDAR) device including: an input unit configured to receive scanning information transmitted from the LIDAR device; and a main controller configured to determine a scannable region and an unscannable region by analyzing the scanning information, and to generate obstacle information by detecting a first region below a ground level in the scannable region and a second region below the ground level in the unscannable region.

The main controller may be configured to detect points located below the ground level in the scannable region, and to determine a set of detected points as the first region.

The main controller may be configured to detect intersection points between an extension of the ground level and an incident ray of the LIDAR device in the unscannable region, and to determine a set of the intersection points as the second region.

The main controller may be configured to determine the first region and the second region being fordable or not.

The main controller may be configured to determine that the first region and the second region are fordable when at least one of widths and depths of the first region and the second region is less than a critical value.

The critical value may be determined according to a type of wheels of the autonomous apparatus.

The main controller may be configured to generate a map reflecting the obstacle information.

The cruise control system may further include a driving controller configured to generate a drive command for controlling a driver of the autonomous apparatus based on the obstacle information.

According to an aspect of another exemplary embodiment, there is provided a cruise control method for an autonomous apparatus including a Light Detection and Ranging (LIDAR) device including: receiving scanning information from the LIDAR device; determining a scannable region and an unscannable region by analyzing the scanning information; and generating obstacle information by detecting a first region below a ground level in the scannable region and a second region below the ground level in the unscannable region.

The generating of the obstacle information may include detecting points located below the ground level in the scannable region, and determining a set of detected points as the first region.

The generating of the obstacle information may include detecting intersect points between an extension of the ground level and an incident ray of the LIDAR device in the unscannable region, and determining a set of the intersect points as the second region.

The generating of the obstacle information may include determining the first region and the second region being fordable or not.

The determining of the fordability may include determining the first region and the second region to be fordable when at least one of widths and depths of the first region and the second region is less than a critical value.

The critical value may be determined according to a type of wheels of the autonomous apparatus.

The cruise control method may further include generating a map reflecting the obstacle information.

The cruise control method may further include generating a drive command for controlling a driver of the autonomous apparatus based on the obstacle information.

According to one or more exemplary embodiments, a non-transitory computer-readable recording medium have recorded thereon a program, which when executed by a computer, performs the above cruise control method.

According to an aspect of another exemplary embodiment, there is provided a cruise control system of an autonomous apparatus having a Light Detection and Ranging (LIDAR) device, the cruise control system being implemented by at least one hardware processor and including: an input unit configured to receive scanning information from the LIDAR device, the scanning information related to peripheral environment of the autonomous apparatus; and a main controller configured to determine a scannable region of the peripheral environment and an unscannable region of the peripheral environment based on the scanning information, and to generate obstacle information by detecting a first sunken region in the scannable region and a second sunken region in the unscannable region.

The main controller may be configured to detect points located below a ground level in the scannable region, and to determine a set of detected points as the first sunken region.

The main controller may be configured to detect intersection points between an extension of a ground level over the second sunken region and an incident ray of the LIDAR device in the unscannable region, and to determine a set of the intersection points as the second sunken region.

The main controller may be configured to determine each of the first sunken region and the second sunken region being fordable.

The main controller may be configured to determine that the first region and the second region are fordable in response to at least one of a first width and a first depth of the first sunken region and at least one of a second width and a second depth the second sunken region being less than a critical value.

The critical value may be determined according to a type of wheels of the autonomous apparatus.

The main controller may be configured to generate a map based on the obstacle information.

The cruise control system may further include a driving controller configured to generate a drive command for controlling a driver of the autonomous apparatus based on the obstacle information.

According to an aspect of another exemplary embodiment, there is provided a cruise control method for an autonomous apparatus including a LIDAR device, the cruise control method including: receiving scanning information related to peripheral environment of the autonomous apparatus and generated from the LIDAR device; determining a scannable region of the peripheral environment and an unscannable region of the peripheral environment based on the scanning information; and generating obstacle information by detecting a first sunken region in the scannable region and a second sunken region in the unscannable region.

The generating the obstacle information may include detecting points located below a ground level in the scannable region, and determining a set of detected points as the first sunken region.

The generating the obstacle information may include detecting intersect points between an extension of a ground level over the second sunken region and an incident ray of the LIDAR device in the unscannable region, and determining a set of the intersect points as the second sunken region.

The generating the obstacle information may include determining each of the first sunken region and the second sunken region being fordable.

The determining the first sunken region and the second sunken region being fordable may include determining the first sunken region and the second sunken region to be fordable in response to at least one of a first width and a first depth of the first sunken region and at least one of a second width and a second depth the second sunken region being less than a critical value.

The cruise control method may further include generating a map based on the obstacle information.

The cruise control method may further include generating a drive command for controlling a driver of the autonomous apparatus based on the obstacle information.

According to an aspect of another exemplary embodiment, there is provided a non-transitory computer-readable recording medium having recorded thereon a program, which when executed by a computer, performs the method of above.

According to an aspect of another exemplary embodiment, there is provided a cruise control system of an autonomous apparatus having a LIDAR device, the cruise control system being implemented by at least one hardware processor and including: an input unit configured to collect scanning information from the LIDAR device, the scanning information based on front topography of the autonomous apparatus; and a main controller configured to analyze the front topography of the autonomous apparatus and determine a first sunken region in a scannable region and a second sunken region in an unscannable region based on the scanning information. The main controller may be configured to determine fordability of the first sunken region in the scannable region and fordability of the second sunken region in the unscannable region.

The main controller may be configured to generate a cruising command for the autonomous apparatus to ford at least one of the first sunken region and the second sunken region based on the determined fordability.

The main controller may be configured to detect points located below a ground level in the scannable region, and to determine a set of detected points as the first sunken region. The main controller may be configured to detect intersection points between an extension of a ground level over the second sunken region and an incident ray of the LIDAR device in the unscannable region, and to determine a set of the intersection points as the second sunken region.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION

Figure 1:
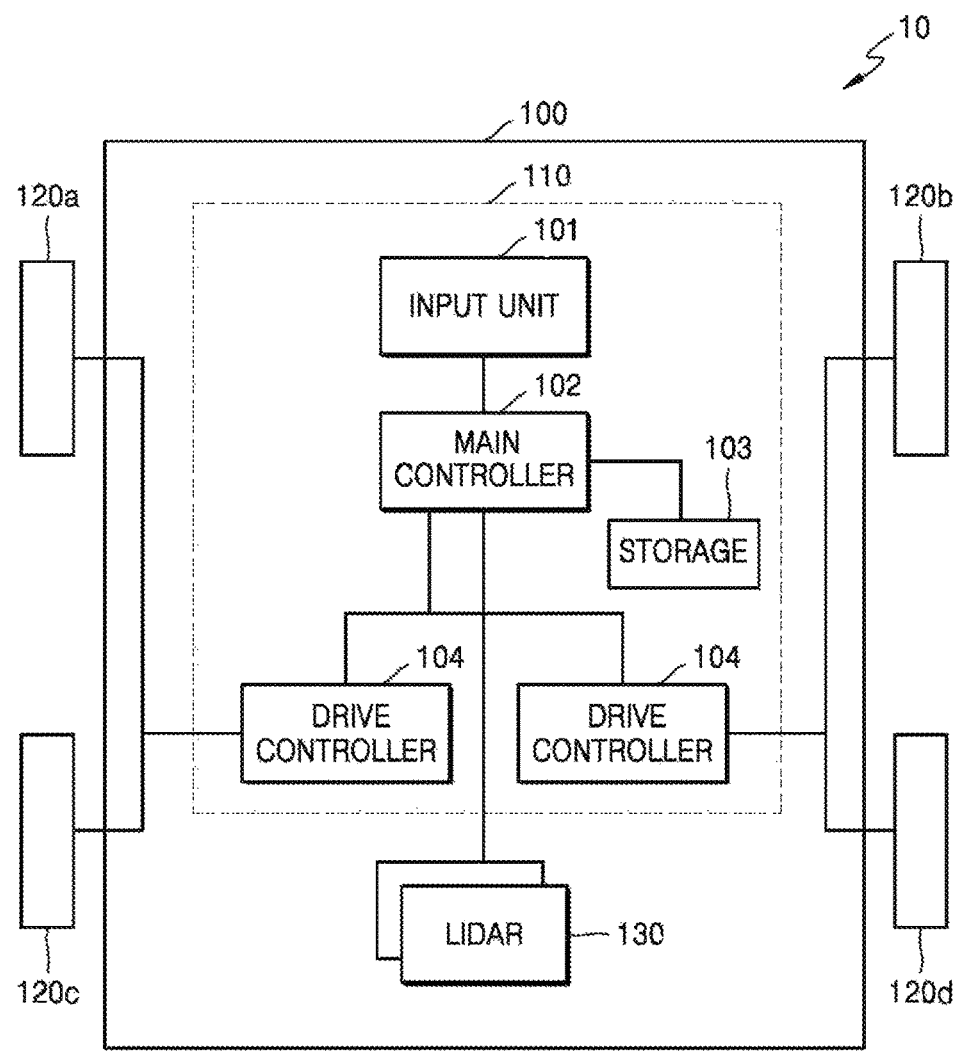
FIG. 1 is a schematic block diagram of an autonomous apparatus according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Content provided hereinafter just illustrates the principles of the present disclosure. Therefore, one of ordinary skill in the art may embody the principles of the present disclosure, although not shown or described explicitly herein, and invent a variety of devices included in the spirit and scope of the present disclosure. In addition, all of the conditional terms and exemplary embodiments listed herein are, in principle, intended to make the concept of the present disclosure understood, and not limited to the particular exemplary embodiments and conditions listed herein. In addition, all the detailed descriptions listing particular exemplary embodiments, as well as the principles of the present disclosure, aspects and exemplary embodiments, are to be understood to intend to include structural and functional equivalents of such information. Also, it is understood that such equivalents include equivalents to be developed in the future, that is, all devices invented to perform the same function, as well as equivalents that are currently known.

Thus, functions of various elements shown in the drawings, including functional blocks labeled as a processor or a similar concept may be provided through use of hardware that has capability of executing software in association with appropriate software, as well as dedicated hardware. When provided by a processor, functions may be provided by a single dedicated processor, single shared processor, or a plurality of individual processors, some of which may be shared. Furthermore, a processor, control, or a term suggested as a similar concept thereof, although it is clearly used, should not be construed as exclusively citing hardware having the ability to execute software, but should be construed as implicitly including Digital Signal Processor (DSP) hardware, or ROM, RAM, or non-volatile memory for storing software without restriction. The processor, control, or term may also include known other hardware.

The above objects, characteristics, and merits will become more apparent from the following detailed description taken in conjunction with the accompanying drawings. In the description, certain detailed explanations of the related art are omitted when it is deemed that they may unnecessarily obscure the essence of the present disclosure.

Throughout the specification, when a portion "includes" an element, another element may be further included, rather than excluding the existence of the other element, unless otherwise described.

Hereinafter, one or more exemplary embodiments of the present disclosure will be described in detail with reference to accompanying drawings.

FIG. 1 is a schematic block diagram of an autonomous apparatus 10 according to an exemplary embodiment.

According to the exemplary embodiment of shown in FIG. 1, the autonomous apparatus 10 is an unmanned moving device (or apparatus) that may operate in environments such as on unpaved roads, on rough terrains, countryside, military operational areas, etc. and may be, for example, a vehicle, a moving robot, etc.

The autonomous apparatus 10 may remotely communicate with a broadcast control center, other autonomous apparatuses, and an operator, may adjust a cruising path, and may cruise along the adjusted cruising path. The autonomous apparatus 10 may perform long distance communication with a command and control server of the broadcast control center via mobile communication, and the command and control server may store/preserve/manage sensor/power consumption/cruising data of the individual autonomous apparatus 10 based on a large capacity database (DB) system.

The autonomous apparatus 10 may have an autonomous cruise function, a function of following other autonomous apparatuses traveling ahead of the autonomous apparatus 10, and a function of moving to a desired place or returning back to a base location in a case of disconnecting communication. The autonomous apparatus 10 may generate a topographic map by analyzing topography of an area (or a region) in front thereof and adjust the cruising path, while performing the above-described autonomous cruise function, the above-described following function, or the above-described returning function.

Referring to FIG. 1, the autonomous apparatus 10 may include a main body 100, drivers 120a, 120b, 120c and 120d (hereinafter 120a to 120d) installed on the main body 100, a cruise control system 110, and a Light Detection and Ranging (LIDAR) device 130.

The LIDAR device 130 is a three-dimensional (3D) laser scanner, and performs 3D scanning of front topography while the autonomous apparatus 10 travels in a forward direction, for example. Scanning information obtained by the LIDAR device 130 may be provided as point data.

The cruise control system 110 may be implemented as variety numbers hardware and/or software configurations executing certain functions. For example, the cruise control system 110 may denote a data processing device built in hardware, and includes a physically structured circuit for executing functions expressed as codes or commands included in a program.

More specifically, at least one of the components, elements, modules or units of the cruise control system 110 in FIG. 1 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

The cruise control system 110 may receive the scanning information from the LIDAR device 130, and analyze the scanning information to detect obstacles. The cruise control system 110 may calculate a distance to an obstacle detected by the LIDAR device 130 based on a travel time duration or a phase difference until a ray irradiated by the LIDAR device 130 is reflected. Here, the obstacle denotes artificial and natural elements (i.e., any elements) that obstruct the movement of the autonomous apparatus 10, and will be referred to as a topographic obstacle. The topographic obstacles may include positive obstacles existing on the ground, for example, a retaining wall, a wire mesh, artificial establishment, rocks, trees, etc., and negative obstacles lower than the ground level, for example, trenches, puddles, a cliff, a river, etc. The cruise control system 110 according to the exemplary embodiment may detect a positive obstacle (e.g., obstacles that protrude from the path) and a negative obstacle (e.g., obstacles that sunken into the path). Hereinafter, detecting of the negative obstacle will be described, and the negative obstacle will be collectively referred to as the obstacle for convenience of description.

The cruise control system 110 may include an input unit 101, a main controller 102, a storage 103, and a driving controller 104.

The input unit 101 may include a communication module and an antenna, and may be connected to an external device (e.g., other autonomous apparatuses, a broadcast control system, a broadcast control device, etc.) via a wireless communication to transmit/receive (transceive) data such as a broadcast command or a cruising command, the scanning information from the LIDAR 130 device, etc. The input unit 101 includes a global positioning system (GPS) module, and may receive location information from a plurality of GPS satellites.

The main controller 102 generates a cruising command according to an operation mode of the autonomous apparatus 10, and then, transmits the cruising command to the driving controller 104. The main controller 102 may store the cruising command in the storage 103. The operation mode may include, for example, a cruise mode, a follow mode, and a return mode. The cruising command may include information such as information about forward movement, backward movement, steering angular velocity or steering angle, running velocity, etc.

The main controller 102 transmits the cruising command received through the input unit 101 to the driving controller 104 in the cruise mode, and stores the cruising command in the storage 103. The main controller 102 may change the cruising command based on the scanning information from the LIDAR device 130 during driving according to the cruising command.

In the follow mode (e.g., a mode of following a different autonomous apparatus traveling ahead of the autonomous apparatus 10), the main controller 102 receives a cruising command generated by a preceding autonomous apparatus and cruise information of the preceding autonomous apparatus via the input unit 101 from the preceding autonomous apparatus to estimate status information based on the cruise information of the preceding autonomous apparatus, and may change the cruising command based on the status information. The status information may include status information of the ground (path) where the preceding autonomous apparatus drives through. Also, the main controller 102 may update the status information and change the cruising command based on the scanning information of the LIDAR device 130 while driving according to the cruising command or the changed cruising command.

In the return mode (e.g., returning back to a base location in a case of disconnecting communication), the main controller 102 reads out the cruising commands and the cruise information stored in the storage unit 103 in an inverse order, estimates the status information based on the read cruise information, and generates a backward cruising command that is obtained by correcting the cruising command based on the status information. In addition, the main controller 102 may update the status information and change the backward cruising command based on the scanning information from the LIDAR device 130 while driving according to the backward cruising command.

In a case where the communication with the outside is disconnected during the cruise mode, the follow mode, and the return mode, the main controller 102 automatically switches to an independent cruise mode, and generates and changes the cruising command based on the scanning information from the LIDAR device 130.

The main controller 102 may analyze the topography scanning information of the LIDAR device 130 and detect obstacles. The scanning information may include a distance to a point where the ray reaches, an irradiation angle of the ray, and an intensity of a reflected ray.

The main controller 102 may distinguish the obstacles from the road based on the scanning information. In particular, the main controller 102 determines a scannable region and an unscannable region based on the scanning information, and detects regions below the ground level in the scannable region and the unscannable region as obstacles. The region below the ground level in the scannable region (hereinafter, referred to as 'first obstacle region') is a region that is below the ground level (sunken from the ground level) and scanned by the LIDAR device 130 such as a trench, a muddy puddle, etc. The region below the ground level (sunken from the ground level) in the unscannable region (hereinafter, referred to as 'second obstacle region') is a region that is below the ground level and not scanned by the LIDAR device 130 such as a waterhole (or puddle), a waterway, cliff, etc.

Unlike in the general road environment, in such an environment as the rough road or cross-country, various negative obstacles (or sunken obstacles) such as the waterhole, the waterway, the trench, etc. exist, and the topography changes according to weather or season, and accordingly, there may be a lack of information based on an existing map. In addition, in a case of a region such as water or cliff which does not reflect a scanning ray SR due to the characteristics of LIDAR device, the topography of the corresponding region may not be identified by using a topography analyzing algorithm available in the related art. According to the exemplary embodiment of the present disclosure, the topography may be estimated through a ray tracing even in the region that does not reflect the ray of the LIDAR device 130.

The main controller 102 may generate obstacle information based on the result of detecting the obstacle. The obstacle information may include data such as the existence of an obstacle, type of the obstacle, location of the obstacle, a size of the obstacle, etc.

The main controller 102 may generate a map representing the roads and the obstacle information. The main controller 102 may update the map by adding the obstacle information to the map. The map may include location information (coordinate information).

The main controller 102 may determine the obstacle being fordable or not, based on the obstacle information. Here, the obstacle being "fordable" means the negative/sunken obstacle being shallow enough to be crossed by riding in the autonomous apparatus 10. The main controller 102 may generate and/or correct the cruising path through a path planning algorithm, based on the location of the obstacle on the map and possibility of passing the obstacle (i.e., based on "fordability of" the autonomous apparatus 10 through the obstacle).

The storage 103 may be implemented as a database. The storage 103 may store the cruising command, cruise information sensed during the cruising process, the obstacle detecting information, and the map generated based on the information.

The driving controller 104 may receive the cruising command according to the cruising path from the main controller 102 to generate a drive command for the drivers 120a to 120d.

The drivers 120a to 120d provide the autonomous apparatus 10 with a driving power, and may include wheels for moving forward and rearward, left and right, a direction control device, and a driving motor.

The driving controller 104 may generate a drive command for avoiding the obstacle or fording the obstacle. The drive command includes a wheel velocity, steering angle, etc.

Although not shown in the drawings, the autonomous apparatus 10 may include a camera for capturing images around the cruising path.

Figure 2:
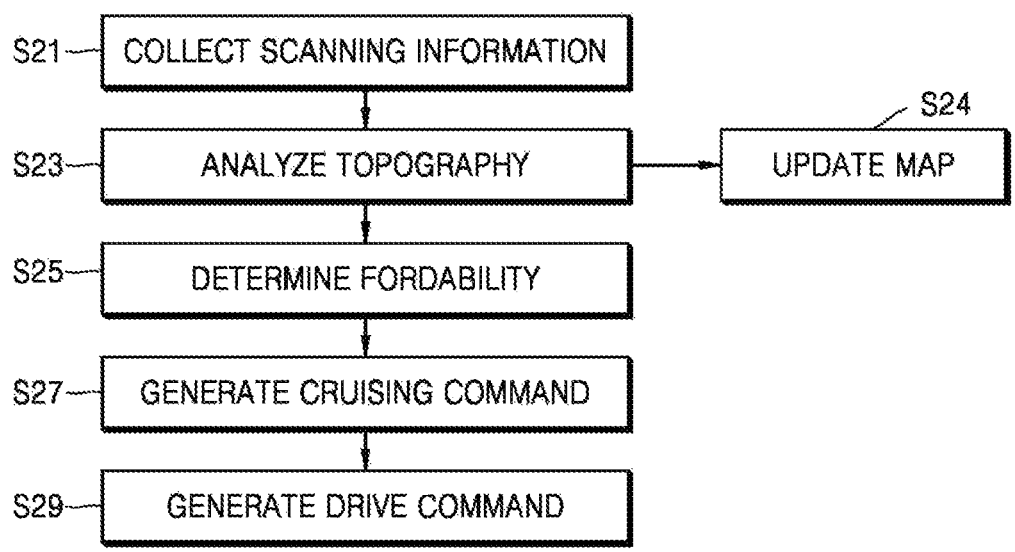
FIG. 2 is a schematic flowchart illustrating an autonomous driving method of the autonomous apparatus of FIG. 1, according to an exemplary embodiment.

FIG. 2 is a schematic flowchart illustrating an autonomous cruise method of the autonomous apparatus 10 of FIG. 1, according to an exemplary embodiment.

Referring to FIG. 2, the main controller 102 may receive topography scanning information from a LIDAR device 130 (S21).

The main controller 102 may perform a topography analyzing operation based on the topography scanning information (S23). The main controller 102 may detect obstacles on a cruising path through the topography analyzing operation. The main controller 102 may update the map by reflecting the result of detecting the obstacle to the map (S24). The main controller 102 may represent the result of detecting a first obstacle region (with sunken obstacles in a scannable region) and a second obstacle region (with sunken obstacles in an unscannable region) on the map.

The main controller 102 may determine whether the detected obstacle being fordable or not, that is, possibility of passing over the (negative/sunken) obstacle (S25).

The main controller 102 changes the cruising path according to the result of detecting the obstacle and the possibility of passing over the obstacle (i.e., fordability), and generates a cruising command according to the changed cruising path (S27).

The main controller 102 may generate a drive command for controlling the drivers according to the cruising command (S29).

Figure 3:
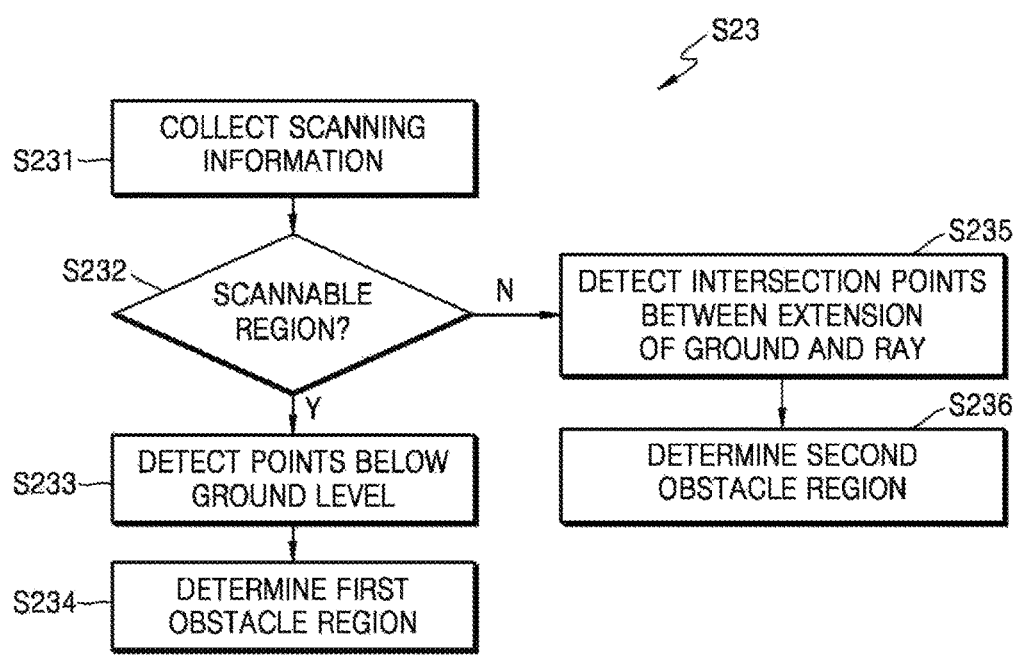
FIG. 3 is a schematic flowchart illustrating a method of analyzing the topography of FIG. 2 according to an exemplary embodiment.
Figure 4:
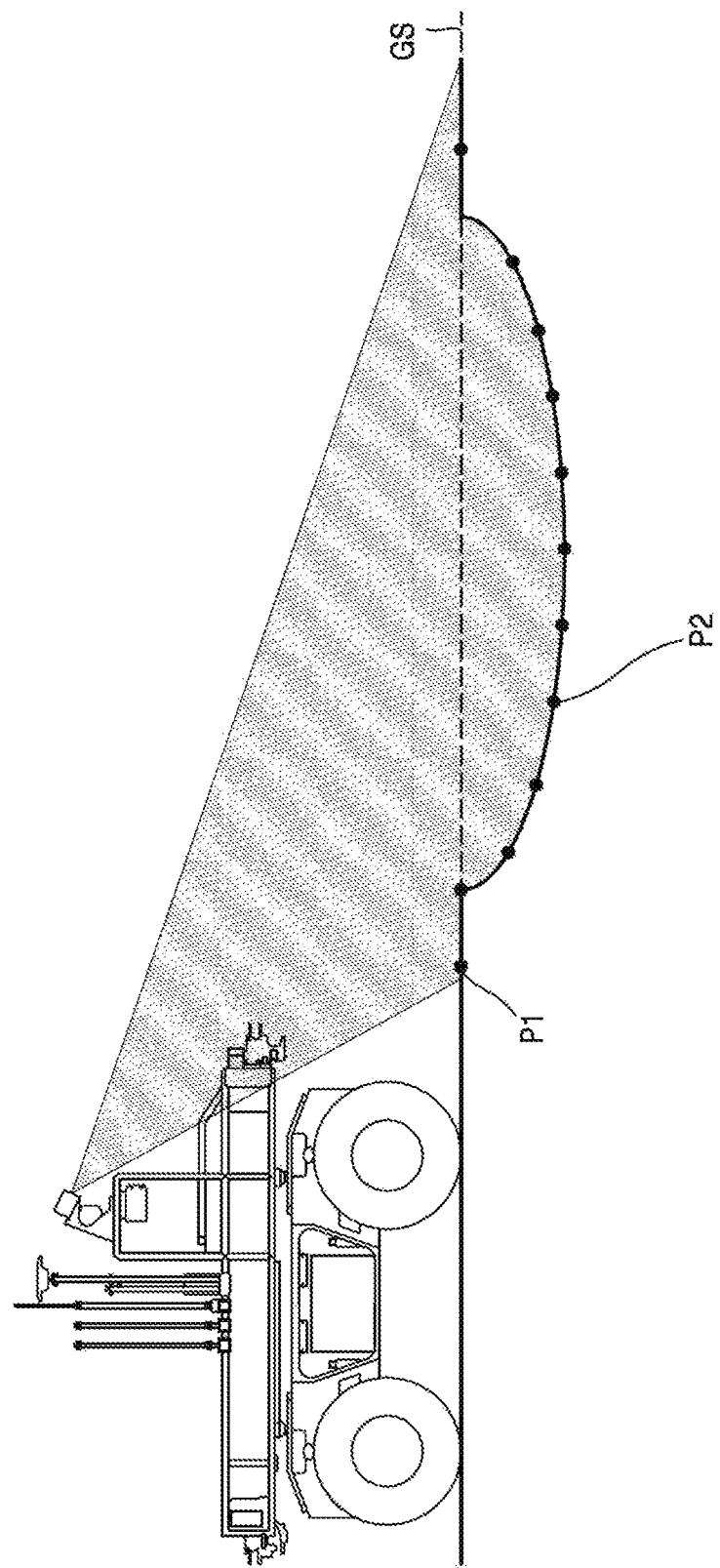
FIGS. 4 and 5 are diagrams illustrating a topography analyzing method.
Figure 5:
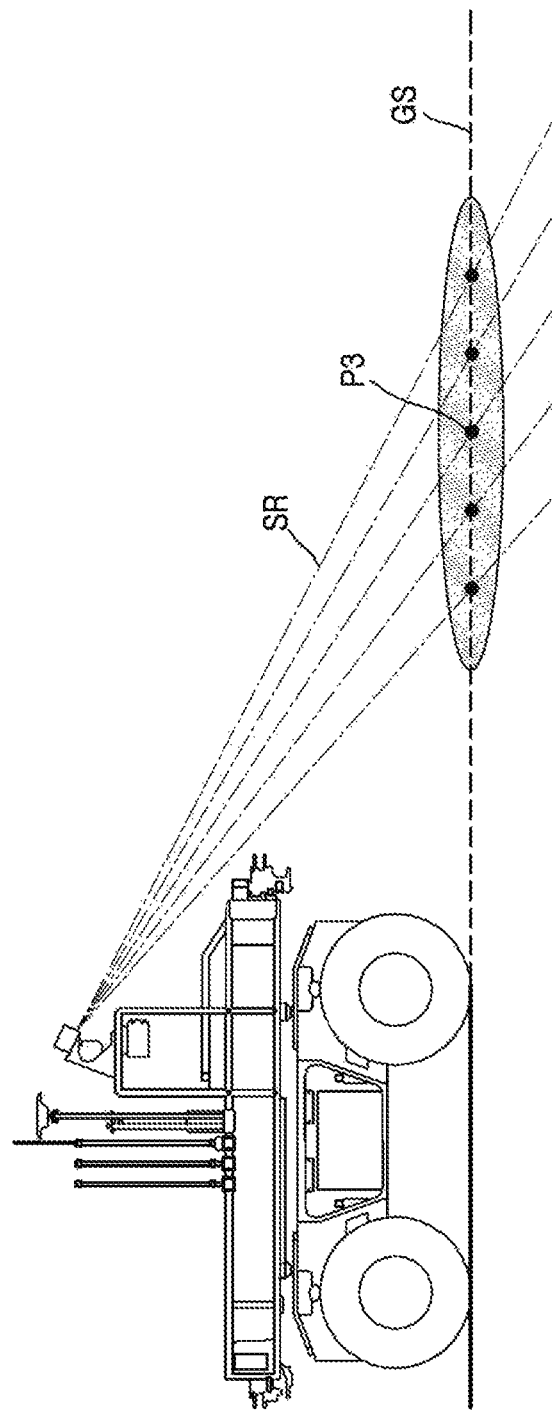

FIG. 3 is a schematic flowchart illustrating a method of analyzing topography of FIG. 2 according to an exemplary embodiment. FIGS. 4 and 5 are diagrams illustrating a topography analyzing method according to exemplary embodiments.

Referring to FIG. 3, the main controller 102 may receive the topography scanning information from the LIDAR device 130, and then, may analyze the scanning information (S231).

As a result of analyzing the scanning information from the LIDAR device 130, the main controller 102 may determine a scannable region and an unscannable region (S232). The unscannable region is a region from which the ray irradiated by the LIDAR device 130 is not reflected.

The main controller 102 may detect points below the ground level from the scanning information of the scannable region (S233). Referring to FIG. 4, the scanning information of the scannable region from the LIDAR device 130 may include data about points P1 located at the ground level and points P2 located below the ground level. The main controller 102 may detect the points P2 below the ground level, that is, below an extending surface of the ground (GS).

The main controller 102 may determine a region formed by a set of the points P2 located below the extending surface of the ground (GS) as the first obstacle region (S234).

Referring to FIG. 5, because there is no scanning information for the unscannable region, the main controller 102 traces scan ray SR by using the ray tracing method to detect intersection points P3 between the extending surface of the ground (GS) and the scan ray SR (S235). In a case where the scan ray SR from the LIDAR device 130 is not reflected, the distance may not be estimated, but it may be estimated where the scan ray SR is not reflected by using the ray tracing method. Therefore, the region where the scanning information is not obtained may be used to plan the autonomous cruising path.

The main controller 102 may determine a region formed by a collection of the intersection points P3 as a second obstacle region (S236).

Figure 6:
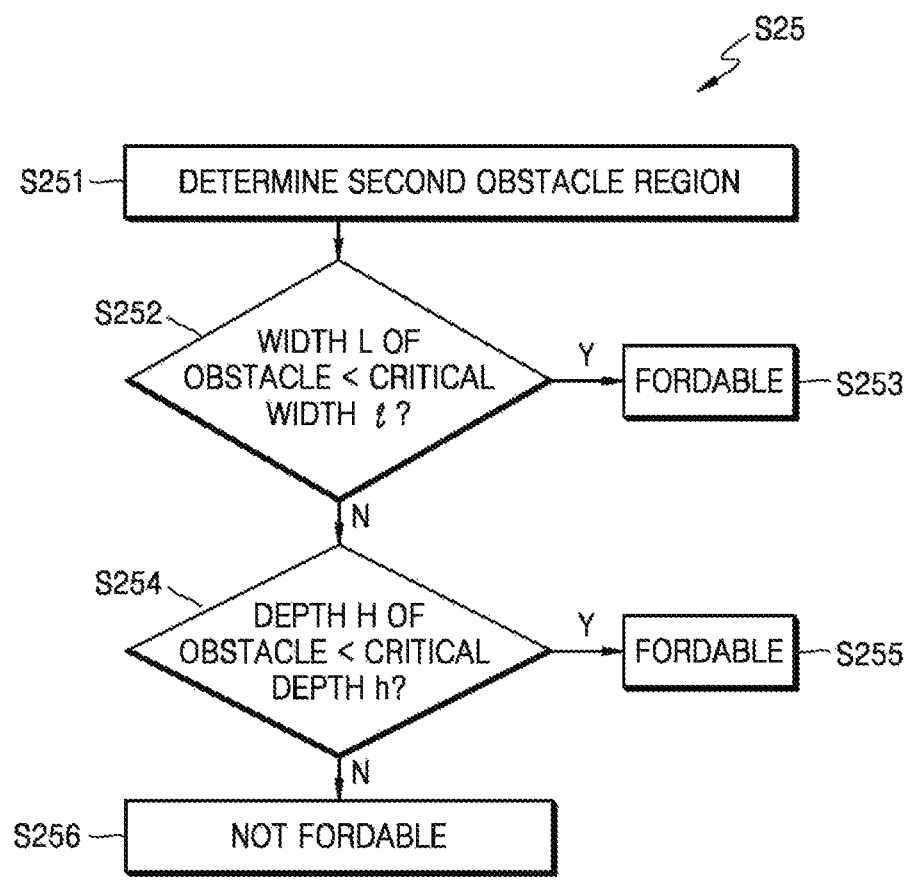
FIG. 6 is a schematic flowchart illustrating a method of determining fordability illustrated in FIG. 2.
Figure 7:
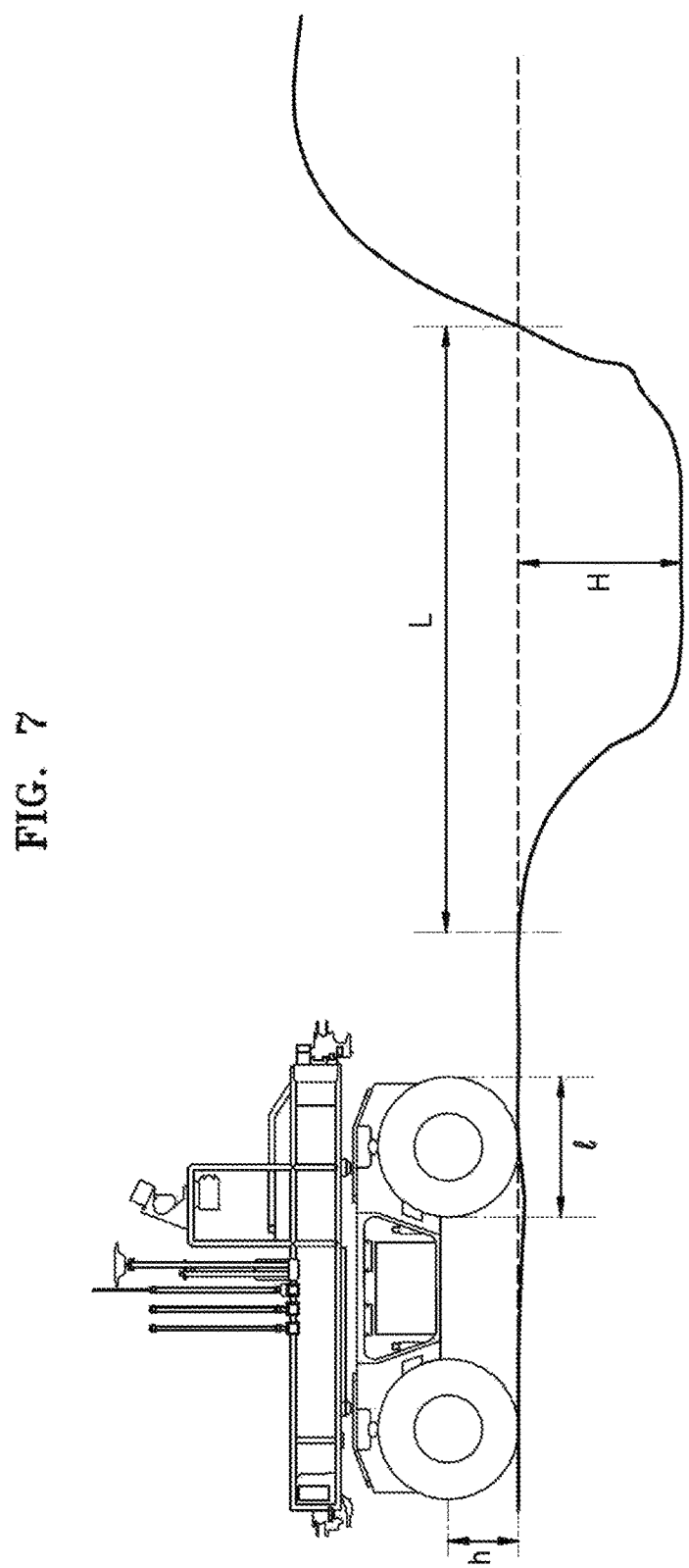
FIGS. 7 and 8 are diagrams illustrating a method of determining fordability.
Figure 8:
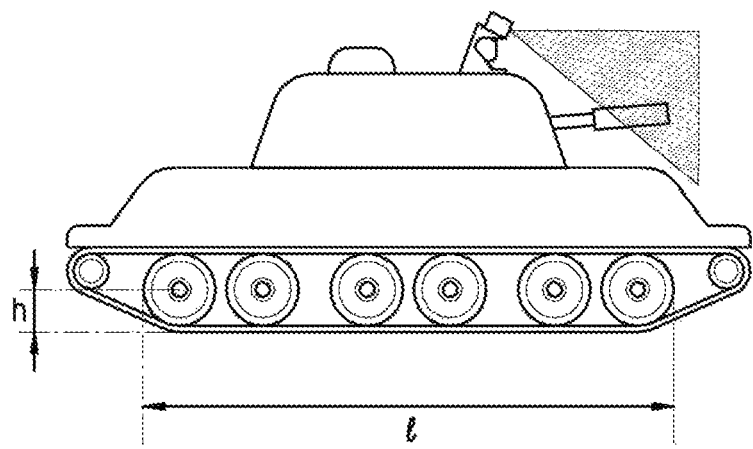

FIG. 6 is a schematic flowchart illustrating a method of determining fordability illustrated in FIG. 2 according to an exemplary embodiment, and FIGS. 7 and 8 are diagrams illustrating a method of determining fordability according to exemplary embodiments.

Referring to FIG. 6, the main controller 102 may calculate a width L and a depth H of the obstacle region, when the first obstacle region and the second obstacle region are detected (S251). The main controller 102 may determine fordability of the obstacle region, by comparing the width L and the depth H of the obstacle region with a critical width I and a critical depth h.

The width L of the obstacle region is calculated along a direction in which the autonomous apparatus 10 is to proceed. The main controller 102 may obtain a boundary line of the obstacle region, and determine the smallest value, from among distances between two boundary points facing each other along a candidate cruising direction, as the width L of the obstacle. The main controller 102 determines candidate cruising directions, in which a distance of fording across the obstacle is shorter than a detouring distance, and calculates distances between two boundary points along with each candidate cruising direction.

The main controller 102 may determine the greatest value, from among heights between the ground surface and a bottom surface within the boundary line of the obstacle region, as the depth H of the obstacle.

The critical width I and the critical depth h may be determined according to types and sizes of the wheels of the autonomous apparatus 10. The main controller 102 may store in advance the critical width I and the critical depth h set by measuring heights and widths of the wheels of the autonomous apparatus 10 in the storage 103.

As shown in FIG. 7, if the wheels of the autonomous apparatus 10 are wheel type, a diameter of the wheel may be determined as the critical width I and a radius of the wheel may be determined as the critical depth h. If the wheels of the autonomous apparatus 10 have different sizes from each other, the critical width I and the critical depth h may be determined according to a diameter of the smallest wheel of the autonomous apparatus 10.

As shown in FIG. 8, if the wheels of the autonomous apparatus 10 are crawler type, a length of a track in a direction parallel with the ground may be determined as the critical width I and half of a height of the track in a direction perpendicular to the ground may be determined as the critical depth h.

Although not shown in the drawings, if the wheels of the autonomous apparatus 10 are half-track type that is a mixture of the wheel type and the crawler type, a diameter of the wheel disposed at a front portion may be determined as the critical width I and a radius of the wheel may be determined as the critical depth h.

The main controller 102 compares the width L of the obstacle with the critical width I (S252), and when the critical width I is greater than the width L of the obstacle, the main controller 102 may determine that the autonomous apparatus 10 may ford the obstacle (S253).

When the width L of the obstacle is equal to or greater than the critical width I, the main controller 102 compares the depth H of the obstacle with the critical depth h (S254). When the critical depth h is greater than the depth H of the obstacle, the main controller 102 may determine that the autonomous apparatus 10 may ford the obstacle (S255).

When the depth H of the obstacle is equal to or greater than the critical depth h, the cruise control system 110 may determine that the autonomous apparatus 10 is not capable of fording the obstacle (S256).

In the exemplary embodiment illustrated in FIG. 8, comparison of the width L of the obstacle is performed and then a comparison of the depth H of the obstacle is performed. However, the comparison of the depth H of the obstacle may be performed prior to the comparison of the width L of the obstacle. In another exemplary embodiment, in a case where the width or the depth of the obstacle is impossible to be determined, for example, the cliff, the river, etc., that is, at least one of the width L and the depth H of the obstacle is impossible to be determined, the main controller 102 may determine that the obstacle is not fordable.

When at least one of the width L and the depth H of the obstacle is smaller than the critical value, the main controller 102 determines the obstacle to be fordable, and when both the width L and the depth H of the obstacle are equal to or greater than the critical values, the main controller 102 may determine that the obstacle is not fordable.

Figure 9A:
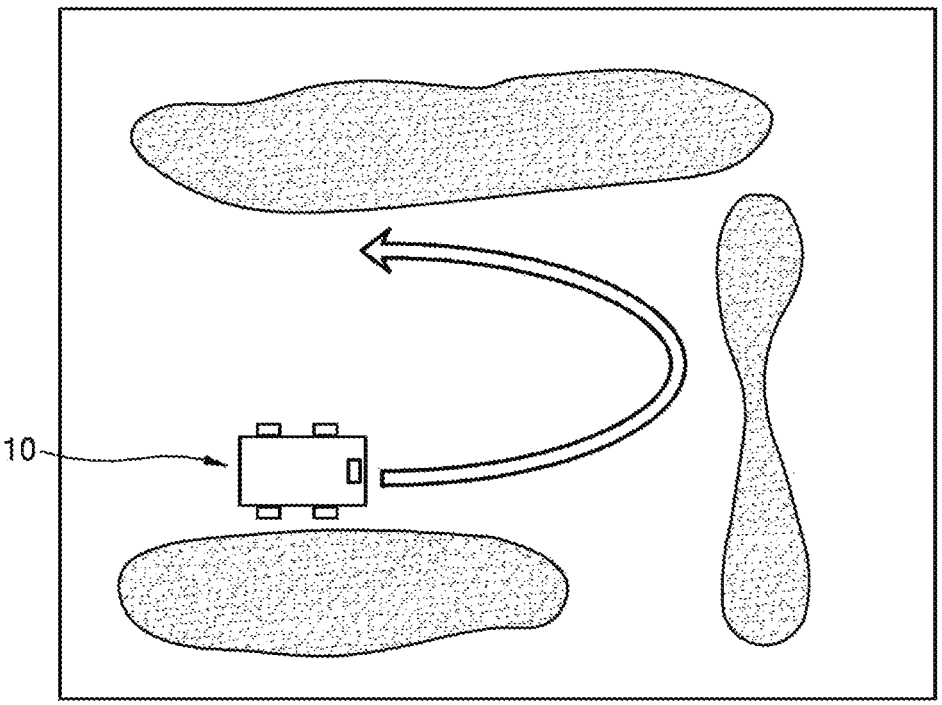
FIGS. 9A and 9B are diagrams illustrating a cruising path change of the autonomous apparatus according to a result of detecting obstacles, according to an exemplary embodiment.
Figure 9B:
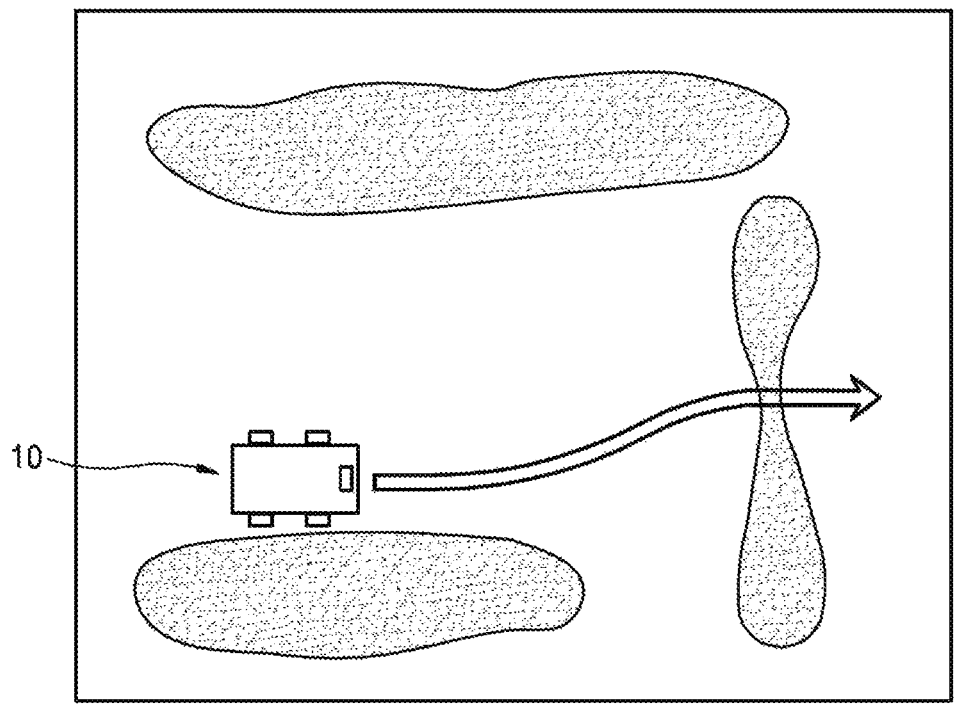

FIGS. 9A and 9B are diagrams illustrating a cruising path change of the autonomous apparatus 10 according to a result of detecting obstacles, according to an exemplary embodiment.

The autonomous apparatus 10 may detect a negative obstacle on the cruising path according to the method of detecting the obstacles described above, based on peripheral environment scanning information of the LIDAR device.

As shown in FIG. 9A, when it is determined that the detected obstacle is not fordable, the autonomous apparatus 10 may change the cruising path to a detouring path.

As shown in FIG. 9B, when it is determined that the detected obstacle is fordable, the autonomous apparatus 10 may change the cruising path to a path across the obstacle. According to the exemplary embodiments, the fordability is determined, and thus, various cruising paths may be planned when being compared with a case the cruising paths only include the detouring paths.

The method of detecting the obstacle in the autonomous apparatus according to the related art uses distance data that is obtained under an assumption that a detecting environment is relatively flat, and is suitable for indoor or road environment. A method of detecting an obstacle in the cross-country may include a method of generating a three-dimensional (3D) world model including altitude information by using various sensors such as a binocular camera, and detecting an obstacle based on the world model. However, according to the above method, a large amount of data has to be obtained from the various sensors and processed, and thus, a long period of time is taken for calculation.

In the method of detecting the obstacle according to the exemplary embodiments, an obstacle is detected based on scanning information obtained by the LIDAR device under various circumstances such as an unpaved road, a rough road, a countryside area, etc., and accordingly, an amount of data is reduced and a short period of time is taken for calculation. Accordingly, the obstacle may be easily detected.

According to the exemplary embodiments of the present disclosure, the autonomous driving function of the unmanned moving device operated in the environments such as a rough road or a countryside area may be improved. In addition, according to the exemplary embodiments of the present disclosure, a type of the obstacle may be identified, and thus, the waterhole that may not be detected by the LIDAR device according to the related art may be detected, and the autonomous driving according the obstacle may be performed.

In addition, a database including various topographic information such as puddles, waterholes, etc. may be established and used as a big database, and accordingly, driving reliability may be improved.

The method of detecting the obstacle and the cruise control method according to the exemplary embodiments of the present disclosure may also be embodied as computer readable codes on a computer readable recording medium. The computer readable recording medium is any data storage device that may store programs or data which may be thereafter read by a computer system. Examples of the computer readable recording medium include read-only memory (ROM), random-access memory (RAM), CD-ROMs, magnetic tapes, floppy disks, optical data storage devices, and so on. The computer readable recording medium may also be distributed over network coupled computer systems so that the computer readable code is stored and executed in a distributive manner. Also, functional programs, codes, and code segments for accomplishing the present disclosure may be easily construed by programmers skilled in the art to which the present disclosure pertains.

The exemplary embodiments of the present disclosure provide a system and method of planning various cruising paths according to the topography of an area, without using other equipment than a laser scanner.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While exemplary embodiments have been described with reference to the figures, it will be understood by those of ordinary skill in the art that various changes in form and details may be made therein without departing from the spirit and scope of the inventive concept as defined by the following claims.

What is claimed is:

1. A cruise control system of an autonomous apparatus having a Light Detection and Ranging (LIDAR) device, the cruise control system being implemented by at least one hardware processor and comprising:
    an input unit configured to receive scanning information from the LIDAR device, the scanning information being related to peripheral environment of the autonomous apparatus; and
    a main controller configured to determine a scannable region of the peripheral environment and an unscannable region of the peripheral environment based on the scanning information, and to generate obstacle information by detecting a first sunken region in the scannable region and a second sunken region in the unscannable region,
wherein the main controller is further configured to determine whether the first sunken region or the second sunken region is fordable based on the obstacle information.

2. The cruise control system of claim 1, wherein the main controller is further configured to control the autonomous apparatus to detour the first sunken region or the second sunken region which is determined to be not fordable, and to control the autonomous apparatus to pass across the first sunken region or the second sunken region which is determined to be fordable.

3. The cruise control system of claim 1, wherein the main controller is configured to detect intersection points between an extension of a ground level over the second sunken region and an incident ray of the LIDAR device in the unscannable region, and to determine a set of the intersection points as the second sunken region.

4. The cruise control system of claim 1, wherein the main controller is configured to determine each of the first sunken region and the second sunken region being fordable.

5. A cruise control system of an autonomous apparatus having a Light Detection and Ranging (LIDAR) device, the cruise control system being implemented by at least one hardware processor and comprising:
an input unit configured to receive scanning information from the LIDAR device, the scanning information being related to peripheral environment of the autonomous apparatus; and
a main controller configured to determine a scannable region of the peripheral environment and an unscannable region of the peripheral environment based on the scanning information, and to generate obstacle information by detecting a first sunken region in the scannable region and a second sunken region in the unscannable region,
wherein the main controller is configured to determine each of the first sunken region and the second sunken region being fordable, and
wherein the main controller is configured to determine that the first region and the second region are fordable in response to at least one of a first width and a first depth of the first sunken region and at least one of a second width and a second depth the second sunken region being less than a critical value.

6. The cruise control system of claim 5, wherein the critical value is determined according to a type of wheels of the autonomous apparatus.

7. The cruise control system of claim 4, wherein the main controller is configured to generate a map based on the obstacle information.

8. The cruise control system of claim 1, further comprising a driving controller configured to generate a drive command for controlling a driver of the autonomous apparatus based on the obstacle information.

9. A cruise control method for an autonomous apparatus including a Light Detection and Ranging (LIDAR) device, the cruise control method comprising:
receiving scanning information related to peripheral environment of the autonomous apparatus and generated from the LIDAR device;
determining a scannable region of the peripheral environment and an unscannable region of the peripheral environment based on the scanning information;
generating obstacle information by detecting a first sunken region in the scannable region and a second sunken region in the unscannable region; and
determining whether the first sunken region or the second sunken region is fordable based on the obstacle information.

10. The cruise control method of claim 9, further comprising:
controlling the autonomous apparatus to detour the first sunken region or the second sunken region which is determined to be not fordable; and
controlling the autonomous apparatus to pass across the first sunken region or the second sunken region which is determined to be fordable.

11. The cruise control method of claim 9, wherein the generating the obstacle information comprises detecting intersect points between an extension of a ground level over the second sunken region and an incident ray of the LIDAR device in the unscannable region, and determining a set of the intersect points as the second sunken region.

12. The cruise control method of claim 9, wherein the generating the obstacle information comprises determining each of the first sunken region and the second sunken region being fordable.

13. A cruise control method for an autonomous apparatus including a Light Detection and Ranging (LIDAR) device, the cruise control method comprising:
receiving scanning information related to peripheral environment of the autonomous apparatus and generated from the LIDAR device;
determining a scannable region of the peripheral environment and an unscannable region of the peripheral environment based on the scanning information; and
generating obstacle information by detecting a first sunken region in the scannable region and a second sunken region in the unscannable region,
wherein the generating the obstacle information comprises determining each of the first sunken region and the second sunken region being fordable, and
wherein the determining the first sunken region and the second sunken region being fordable comprises determining the first sunken region and the second sunken region to be fordable in response to at least one of a first width and a first depth of the first sunken region and at least one of a second width and a second depth the second sunken region being less than a critical value.

14. The cruise control method of claim 13, wherein the critical value is determined according to a type of wheels of the autonomous apparatus.

15. The cruise control method of claim 9, further comprising generating a map based on the obstacle information.

16. The cruise control method of claim 9, further comprising generating a drive command for controlling a driver of the autonomous apparatus based on the obstacle information.

17. A non-transitory computer-readable recording medium having recorded thereon a program, which when executed by a computer, performs the method of claim 9.

18. The cruise control system of claim 1, wherein the input unit is configured to receive the scanning information by analyzing a laser ray irradiated by the LIDAR device and reflected from the peripheral environment.

19. The cruise control system of claim 18, wherein the main controller is configured to generate a cruising command for the autonomous apparatus to ford at least one of the first sunken region and the second sunken region based on the determined fordability.

20. The cruise control system of claim 18, wherein the main controller is configured to detect points located below a ground level in the scannable region, and to determine a set of detected points as the first sunken region, and wherein the main controller is configured to detect intersection points between an extension of a ground level over the second sunken region and an incident ray of the LIDAR device in the unscannable region, and to determine a set of the intersection points as the second sunken region.

\* \* \* \* \*